US010547471B2

(12) United States Patent
Kida et al.

(10) Patent No.: US 10,547,471 B2
(45) Date of Patent: Jan. 28, 2020

(54) COMMUNICATION CONTROL SYSTEM AND COMMUNICATION CONTROL METHOD

(71) Applicant: Kobe Steel, Ltd., Kobe-shi (JP)

(72) Inventors: Naoki Kida, Kanagawa (JP); Shuichi Inada, Kanagawa (JP); Takashi Wada, Hyogo (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 16/087,217

(22) PCT Filed: Feb. 16, 2017

(86) PCT No.: PCT/JP2017/005699
§ 371 (c)(1),
(2) Date: Sep. 21, 2018

(87) PCT Pub. No.: WO2017/163683
PCT Pub. Date: Sep. 28, 2017

(65) Prior Publication Data
US 2019/0103989 A1 Apr. 4, 2019

(30) Foreign Application Priority Data

Mar. 24, 2016 (JP) .................................. 2016-060157

(51) Int. Cl.
*H04L 12/40* (2006.01)
*B25J 9/16* (2006.01)
*B25J 13/00* (2006.01)
(52) U.S. Cl.
CPC ........ *H04L 12/4013* (2013.01); *B25J 9/1682* (2013.01); *B25J 13/006* (2013.01); *H04L 12/40019* (2013.01); *H04L 2012/4026* (2013.01)

(58) Field of Classification Search
CPC . G06F 1/14; G06F 13/10; G06F 13/12; G06F 13/124; G06F 13/126; G06F 13/14;
(Continued)

(56) References Cited

U.S. PATENT DOCUMENTS 9,032,268 B1* 5/2015 Ryu ...................... H04L 1/0041
714/759
2003/0002539 A1* 1/2003 Soda ..................... H04J 3/0685
370/509
(Continued)

FOREIGN PATENT DOCUMENTS

EP 2 490 358 A2 2/2012
JP 2012-170036 A 9/2012

OTHER PUBLICATIONS

International Search Report dated May 16, 2017 on PCT/JP2017/005699 filed Feb. 16, 2017.

*Primary Examiner* — Thomas J. Cleary
(74) *Attorney, Agent, or Firm* — Oblon, McClelland, Maier & Neustadt, L.L.P.

(57) ABSTRACT

Provided is a communication control system in which a control device and one or a plurality of control target devices are connected through a network, wherein at least one of the plurality of control target devices includes a sub master and a sub slave to be synchronously controlled with each other, and the control device includes a storage unit storing each pieces of information on a synchronization period for synchronizing with the control target device, communication periods, and mutual communication control information for mutually communicate in a mutual communication period shorter than the synchronization period, a calculation unit calculating a control command for commanding an operation in synchronization with the control target device for each control target device, and a communication control unit transmitting the control command including the mutual (Continued)

communication control information to the sub master and the sub slave of the at least one control target device.

11 Claims, 9 Drawing Sheets

(58) Field of Classification Search
 CPC .... G06F 13/16; G06F 13/3625; G06F 13/372; G06F 13/42; H04L 12/28; H04L 12/40019; H04L 12/4013; H04L 2012/4026; B25J 9/1682; B25J 13/006; G05B 19/414
 See application file for complete search history.

(56) References Cited

U.S. PATENT DOCUMENTS

| | | | |
|---|---|---|---|
| 2004/0002778 A1* | 1/2004 | Giamona | G05B 19/4141 700/61 |
| 2005/0055469 A1* | 3/2005 | Scheele | H04J 3/0664 713/375 |
| 2007/0288618 A1* | 12/2007 | Yeo | H04W 8/005 709/223 |
| 2009/0228732 A1* | 9/2009 | Budde | H04B 7/269 713/400 |
| 2013/0132501 A1* | 5/2013 | Vandwalle | H04L 67/104 709/208 |
| 2013/0134919 A1* | 5/2013 | Takayama | G05B 19/416 318/625 |
| 2014/0292232 A1* | 10/2014 | Tsutsumi | H02P 29/025 318/85 |
| 2015/0355633 A1* | 12/2015 | Nagatani | G05B 19/4155 700/275 |
| 2016/0347179 A1* | 12/2016 | Bachmaier | B60L 50/62 |
| 2017/0187479 A1* | 6/2017 | Yamamoto | H04J 3/0638 |
| 2017/0308041 A1* | 10/2017 | Morita | H02P 5/56 |
| 2017/0315534 A1* | 11/2017 | Horiguchi | G05B 19/4103 |
| 2019/0036731 A1* | 1/2019 | Buecher | G06F 13/3625 |

* cited by examiner

FIG.6

| TRANSMISSION TIME (START AT 0 msec) | DATA 1 | DATA 2 | DATA 3 | DATA 4 | DATA 5 | DATA 6 |
|---|---|---|---|---|---|---|
| 1msec | TRANSMISSION AND RECEPTION | TRANSMISSION AND RECEPTION | | | | TRANSMISSION AND RECEPTION |
| 2msec | TRANSMISSION AND RECEPTION | TRANSMISSION AND RECEPTION | TRANSMISSION AND RECEPTION | TRANSMISSION AND RECEPTION | | |
| 3msec | TRANSMISSION AND RECEPTION | TRANSMISSION AND RECEPTION | TRANSMISSION AND RECEPTION | TRANSMISSION AND RECEPTION | | |
| 4msec | TRANSMISSION AND RECEPTION | TRANSMISSION AND RECEPTION | | | TRANSMISSION AND RECEPTION | |
| 5msec | TRANSMISSION AND RECEPTION | TRANSMISSION AND RECEPTION | | | | |
| 6msec | TRANSMISSION AND RECEPTION | TRANSMISSION AND RECEPTION | TRANSMISSION AND RECEPTION | TRANSMISSION AND RECEPTION | | TRANSMISSION AND RECEPTION |
| 7msec | TRANSMISSION AND RECEPTION | TRANSMISSION AND RECEPTION | TRANSMISSION AND RECEPTION | TRANSMISSION AND RECEPTION | | |
| 8msec | TRANSMISSION AND RECEPTION | TRANSMISSION AND RECEPTION | TRANSMISSION AND RECEPTION | TRANSMISSION AND RECEPTION | | |
| 9msec | TRANSMISSION AND RECEPTION | TRANSMISSION AND RECEPTION | | | TRANSMISSION AND RECEPTION | |
| 10msec | TRANSMISSION AND RECEPTION | TRANSMISSION AND RECEPTION | | | | |
| 11msec | TRANSMISSION AND RECEPTION | TRANSMISSION AND RECEPTION | | | | TRANSMISSION AND RECEPTION |

Communication period (Data 6 at 1msec); Synchronization period spans 1msec–5msec and 6msec–10msec.

COMMUNICATION CONTROL SYSTEM AND COMMUNICATION CONTROL METHOD

TECHNICAL FIELD

The present invention relates to a communication control system and a communication control method.

BACKGROUND ART

For example, an industrial robot used in welding generally operates synchronously with a peripheral device such as a welding power source, a positioner, and a slider. As a method of the synchronization, for example, a method of controlling communication through a network using RS-232C, RS-485, RS-422, Ethernet (registered trademark), Controller Area Network (CAN) (registered trademark), or the like is used.

As a related art for establishing synchronization between devices, for example, Patent Document 1 discloses communication control device that communicates with one or a plurality of control devices through a network. The communication control device includes a non-periodic transmission unit that generates a transmission request at an arbitrary time, a periodic transmission unit that generates a transmission request in a fixed period, a communication unit that communicates transmission data of the non-periodic transmission unit and the periodic transmission unit with the network, and a schedule unit that transmits transmission contents of the periodic transmission unit to the communication unit, calculates a communication processing time required for non-periodic transmission unit communication processing in a transmission request, obtains a remaining time of the fixed period of the periodic transmission unit, compares the communication processing time with the remaining time of the fixed period, and transmits the transmission contents of the non-periodic transmission unit to the communication unit.

CITATION LIST

Patent Document

Patent Document 1: JP-A-2012-170036

SUMMARY OF THE INVENTION

Problems that the Invention is to Solve

Transmission and reception of data are usually performed between the devices in order to synchronously operate a plurality of devices. However, for example, since a multi-axis industrial robot having many joints is used or the number of devices to be synchronized increased, a data capacity transmitted and received for the synchronization may increase. Here, a data capacity that is able to be transmitted and received in one communication is generally limited. Therefore, since the data capacity that is able to be transmitted and received for the synchronization increases, the transmission and reception of the data are not performed in one synchronization communication and the synchronization is not normally performed between the devices in some cases. The technique of Patent Document 1 is not for a case where data transmitted and received for the synchronization becomes a large capacity.

Among a plurality of devices, there is a device including a plurality of drive shafts (for example, two shafts) such as a positioner or a slider, and it is important to ensure synchronization between the drive shafts of the corresponding devices. However, in a situation in which the data capacity for the synchronization between the devices increases as described above, it is difficult to improve accuracy of a synchronization control between the plurality of drive shafts in the device.

An object of the present invention is to ensure accuracy of synchronization of drive shafts in a device while synchronously operating a plurality of devices.

Means for Solving the Problems

According to the present invention, a communication control system is provided in which a control device and one or a plurality of control target devices are connected through a network. At least one of the plurality of control target devices includes a sub master and a sub slave to be synchronously controlled with each other, and the control device includes a storage unit which stores each pieces of information on a synchronization period that is a period for synchronizing with the control target device, communication periods that are a plurality of periods provided during one period of the corresponding synchronization period, and mutual communication control information for enabling the sub master and the sub slave to mutually communicate in a mutual communication period shorter than the synchronization period, a calculation unit which calculates a control command for commanding an operation in synchronization with the control target device for each control target device, and a communication control unit which transmits the control command including the mutual communication control information to the sub master and the sub slave of the at least one control target device.

As an embodiment of the present invention, for example, in a case where an operation correction between the sub master and the sub slave is performed in the mutual communication between the sub master and the sub slave, the sub slave adjusts an operation itself using the sub master as a reference.

As an embodiment of the present invention, for example, the synchronization period is a multiple of the mutual communication period, the synchronization period is equal to or less than 10 msec, the mutual communication period is equal to or less than 500 μsec, and a ratio of the synchronization period and the mutual communication period is equal to or greater than 20.

As an embodiment of the present invention, for example, a control method of the sub master is position control and the sub slave is able to select either the position control or torque control.

According to the present invention, a communication control method for performing communication between a control device and one or a plurality of control target devices to be synchronized with each other is provided. At least one of the plurality of control target devices includes a sub master and a sub slave to be synchronously controlled by each other. The communication control method includes steps of: storing each pieces of information on a synchronization period that is a period for synchronizing with the control target device, communication periods that are a plurality of periods provided during one period of the corresponding synchronization period, and mutual communication control information for enabling the sub master and the sub slave to mutually communicate in a mutual communication period shorter than the synchronization period; calculating a control command for commanding an operation in synchronization with the control target device for each control target device; and transmitting the control command including the mutual communication control information to the sub master and the sub slave of the at least one control target device.

Advantages of the Invention

According to the present invention, it is possible to synchronously operate drive shafts in a device regarding the device having a plurality of drive shafts while synchronously operating a plurality of devices.

BRIEF DESCRIPTION OF THE DRAWINGS

FIG. 6 is a diagram for describing the example of the control command frame transmitted from the control device to each slave device in periodic communication.

FIGS. 7A and 7B are perspective views of a specific example of a positioner and a slider, wherein FIG. 7A is a diagram illustrating an example of the positioner and FIG. 7B is a diagram illustrating an example of the slider.

MODES FOR CARRYING OUT THE INVENTION

Figure 1:
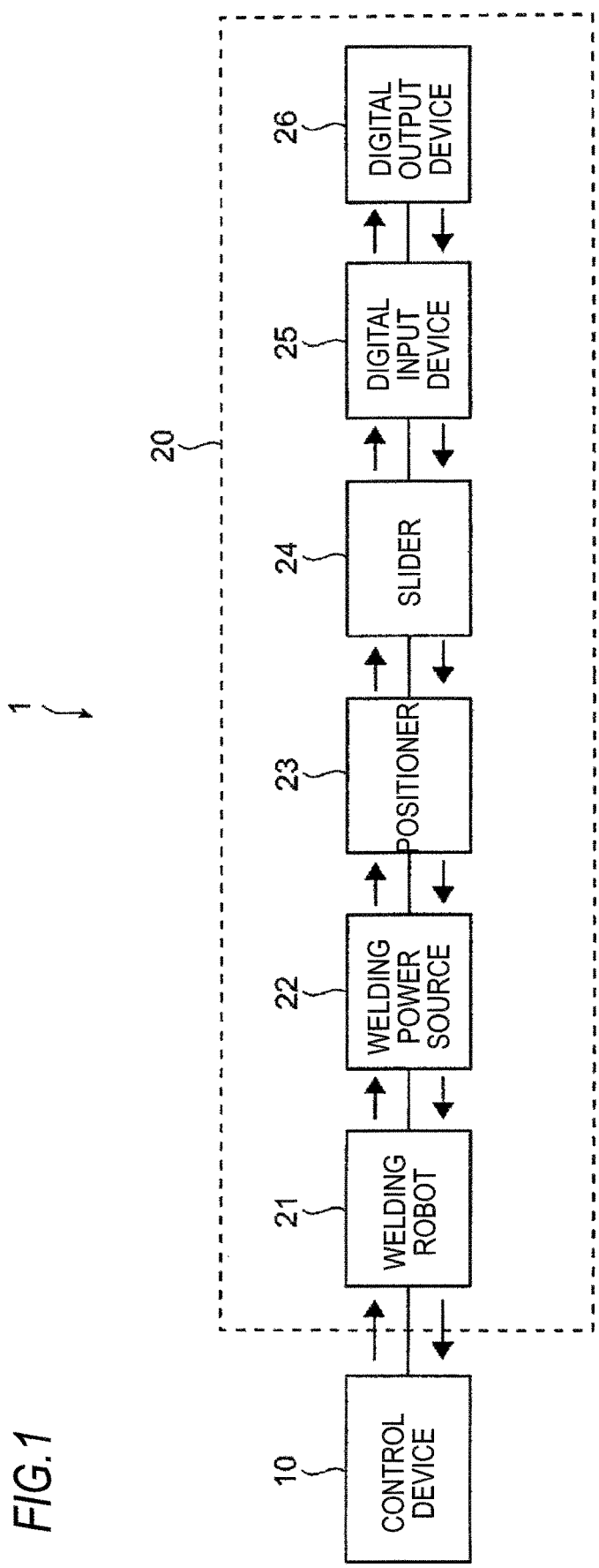
FIG. 1 is a diagram illustrating an example of a schematic configuration of a welding system according to the present embodiment.

Hereinafter, embodiments of the present invention will be described in detail with reference to the accompanying drawings.
<System Configuration>
First, a welding system 1 according to the present embodiment will be described. FIG. 1 is a diagram illustrating an example of a schematic configuration of the welding system 1 according to the present embodiment.

As shown in FIG. 1, the welding system 1 according to the present embodiment includes a control device 10, a welding robot 21, a welding power source 22, a positioner 23, a slider 24, a digital input device 25, and a digital output device 26. Here, the control device 10 functions as a master, and others like the welding robot 21, the welding power source 22, the positioner 23, the slider 24, the digital input device 25, and the digital output device 26 function as slaves. The welding system 1 is configured to synchronously operate the master and the slave by sequentially passing frames transmitted from the master through all the slaves and returning to the master again by turning back.

In the following description, the welding robot 21, the welding power source 22, the positioner 23, the slider 24, the digital input device 25, and the digital output device 26 are referred to as the slave devices 20 in some cases, in a case where it is not necessary to distinguish each other. In the present embodiment, the slave device 20 is used as an example of a control target device. The control device 10 and the slave device 20 are connected through a network, and thus a communication control system that implements a communication control method is constructed.

In the present embodiment, it is described that wired communication is performed in the network and EtherCAT (registered trademark) is used as a communication method, but the present invention is not limited to such configuration. In the present embodiment, a type of the communication method is not limited to EtherCAT, and the type of the communication method may be wired communication or wireless communication.

The control device 10 is a device that controls processing in the welding system 1 and generates a control command for commanding each slave device 20 to synchronously operate. Here, the control device 10 generates the control command for each slave device 20, stores the generated control command in the frame, and transmits the generates control command to each slave device 20. That is, a frame transmitted as the control command of the slave device 20 from the control device 10 (hereinafter, referred to as a control command frame) stores, for example, data of a control command for the welding robot 21, data of a control command for the welding power source 22, or the like.

In transmitting the control command frame by the control device 10, a period for establishing the synchronization (hereinafter, referred to as a synchronization period) between the control device 10 and the slave device 20 is set in advance. A communication period that is a period obtained by further dividing the synchronization period is also set in advance. That is, a plurality of communication period shorter than the synchronization period are provided in one period of the synchronization period, and the synchronization period has a length equal to or longer than two communication periods.

Here, a format of the frame transmitted and received for the synchronized operation in the welding system 1 is determined by the communication method such as EtherCAT, and a maximum capacity (for example, 1500 bytes) of the frame that is able to be transmitted and received at once is also determined. Therefore, even if a control command frame having a number of bytes greater than the maximum capacity is transmitted, for example, the control command frame is discarded by a device of a reception side, and transmission and reception of data is not normally performed. Also in the present embodiment, in a case where the control device 10 attempts to store the control commands for all slave devices 20 in one control command frame, the maximum capacity of the determined frame is exceeded.

Therefore, the control device 10 distributes the control commands for the respective slave devices 20 to the plurality of communication periods respectively provided in the synchronization period so that the control command is fit within the maximum capacity of the frame, rather than transmitting the control commands for all slave devices 20 at once by concentrating the control commands in one communication period. The control device 10 generates and transmits the control command frame in each communication period.

For example, in a first communication period within the synchronization period, the control device 10 stores data of a control command for the welding robot 21, data of a control command for the welding power source 22, data of a control command for the digital output device 26 in the control command frame and transmits those data. Next, for example, in a second communication period within the synchronization period, the control device 10 stores the data of the control command for the welding robot 21, the data of the control command for the welding power source 22, data of a control command for the positioner 23, and data of a control command for the slider 24 in the control command frame and transmits those data. However, since the control device 10 establishes the synchronization between the control device 10 and all slave devices 20, the control commands for the respective slave devices 20 are allocated to at least one communication period among the plurality of communication periods provided in the synchronization period and transmitted.

The control device 10 transmits a clock signal for notifying each of the slave devices 20 of a synchronization timing in each synchronization period. The control device 10 repeatedly executes the transmission of such a clock signal and control command for each synchronization period and performs a control for establishing the synchronization between the control device 10 and each slave device 20.

Next, each slave device 20 will be described.

The welding robot 21 includes an arm having a plurality of joints and performs various operations related to welding. At a tip of the arm of the welding robot 21, a welding torch for performing the welding operation on a workpiece is provided.

The welding power source 22 supplies electric power to an electrode (for example, a welding wire) held by the welding torch of the welding robot 21. As the welding power source 22 supplies electric power, an arc is generated at the electrode of the welding torch provided in the welding robot 21.

The positioner 23 adjusts a position of the workpiece.

The slider 24 is disposed under the welding robot 21 and moves the welding robot 21.

The digital input device 25 is, for example, a keyboard or a touch panel display and receives an input of digital data from an outside.

The digital output device 26 is, for example, a display device having a display and outputs the digital data to the outside.

In a case where each slave device 20 receives a control command frame storing the data of the control command addressed to each slave device (hereinafter, the data of the control command generated by the control device 10 is referred to as command data), each slave device 20 acquires the command data addressed to each slave device from the control command frame. Each slave device 20 reflects the control command of the command data already acquired within one synchronization period for each timing when the clock signal is received using a reception interval of the clock signal as the synchronization period, and executes the operation.

In a case where each slave device 20 receives the control command frame storing the command data addressed to each slave device, each slave device 20 generates data of contents that feeds back an operation situation at the time of the reception (that is, an execution result of the control command at the time of the reception) (hereinafter, the data generated as the execution result of the control command is referred to as monitor data). Each slave device 20 stores the generated monitor data in the control command frame instead of the command data addressed to itself and transmits the generated monitor data to the control device 10.

In this manner, the control command frame is transmitted from the control device 10 to each slave device 20, received by all slave devices 20, and then finally returned to the control device 10 by repeatedly or passing through all slave devices 20. The control device 10 acquires the monitor data of each slave device 20 stored in the returned control command frame. The command data and the monitor data are exchanged between the control device 10 and the each slave device 20, and synchronization control by the control device 10 is performed.

<Functional Configuration of Control Device>

Figure 2:
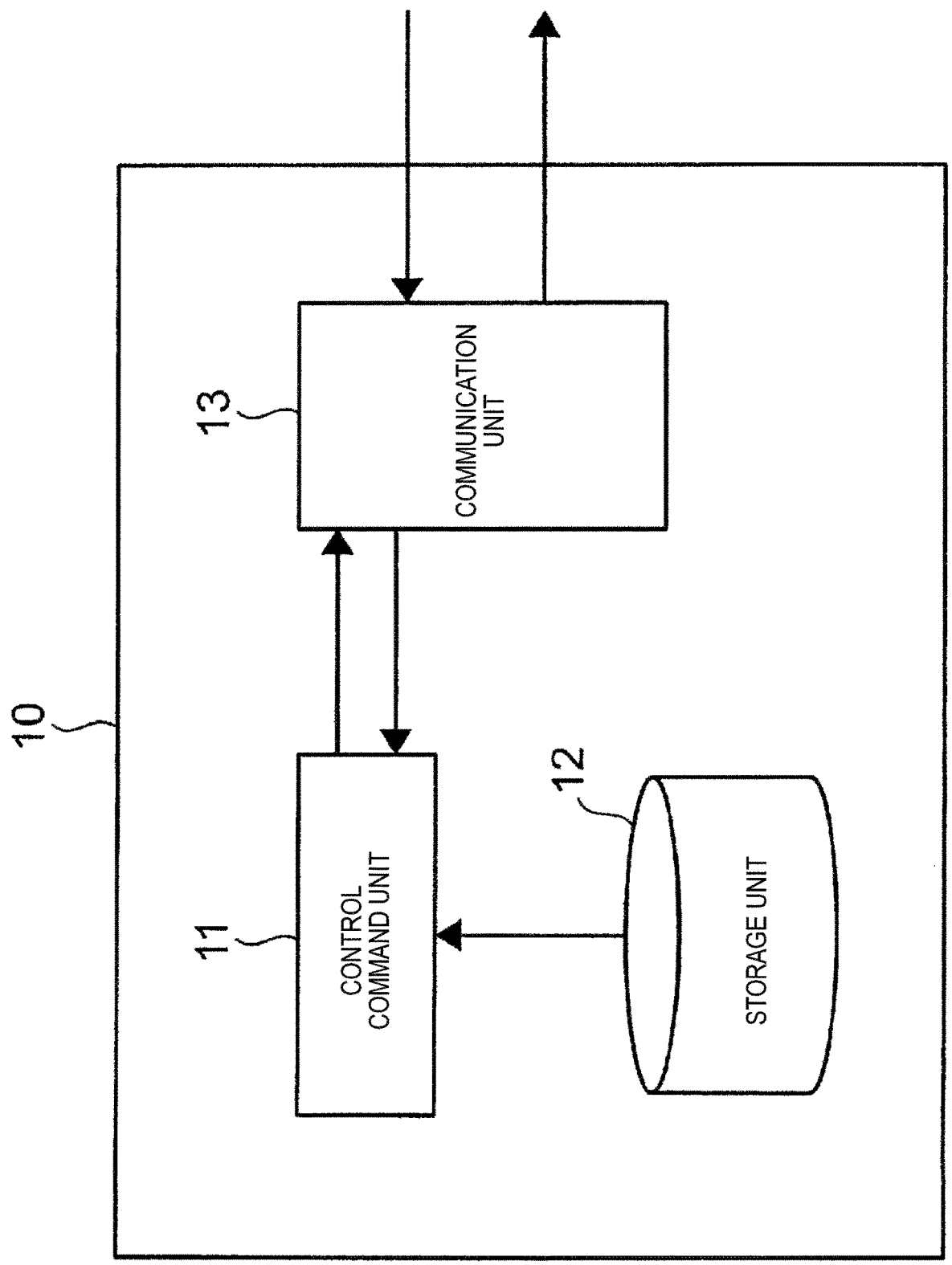
FIG. 2 is a block diagram illustrating a functional configuration example of a control device according to the embodiment.

Next, the functional configuration of the control device 10 according to the present embodiment will be described. FIG. 2 is a block diagram illustrating a functional configuration example of the control device 10 according to the present embodiment. The control device 10 includes a control command unit 11 that generates the control command for each slave device 20 and outputs the control command frame, a storage unit 12 that stores information on the synchronization period and the communication period, and a communication unit 13 that performs the transmission and reception of the data to and from each of the slave devices 20.

The control command unit 11 generates the command data by calculating a designation value for designating the operation of each slave device 20. The control command unit 11 transmits the control command frame storing the generated command data to each slave device 20 through the communication unit 13. The control command unit 11 receives the control command frame that has returned through each slave device 20 from the communication unit 13, acquires the monitor data stored in the received control command frame, and recognizes a processing result of each slave device 20. The control command unit 11 transmits the clock signal to each slave device 20 for each synchronization period.

Before transmitting the clock signal or the control command frame to each slave device 20, the control command unit 11 transmits a command for performing setting of a parameter, correction of the parameter, and the like used for the operation of the slave device 20 to each slave device 20. Here, the transmitted command is a non-periodically transmitted command with respect to periodic command that is transmitted in a regular period such as the synchronization period or the communication period, and is transmitted using a surplus time of the synchronization period or the communication period. In the following description, communication performed for the parameter setting or the like such a slave device 20 is referred to as non-periodic communication, and communication performed in the synchronization period or the communication period after the non-periodic communication is performed is referred to as periodic communication. In the present embodiment, as an example of the calculation unit and the communication control unit, the control command unit 11 is used.

The storage unit 12 stores a database determining the information on the synchronization period and the communication period (hereinafter, referred to as a "synchronization DB"). In the synchronization DB, information on a length of a time of the synchronization period and the communication period, a timing of the communication period at which the command data addressed to each slave device 20 is transmitted in the synchronization period, a position in the control command frame in which the command data addressed to each slave device 20 is stored, and the like is stored. The information of the synchronization DB is used when the control command unit 11 transmits the clock signal and the control command frame by the periodic communication. In the present embodiment, the storage unit 12 is used as an example of a storage unit.

The communication unit 13 performs the transmission and reception of the data in the periodic communication and the non-periodic communication. For example, in the periodic communication, the communication unit 13 transmits the control command frame generated by the control command unit 11 from the control device 10 to each slave device 20. The communication unit 13 receives the control command frame that has returned through the each slave device 20 and outputs the received control command frame to the control command unit 11.

<Hardware Configuration of Control Device>

Figure 3:
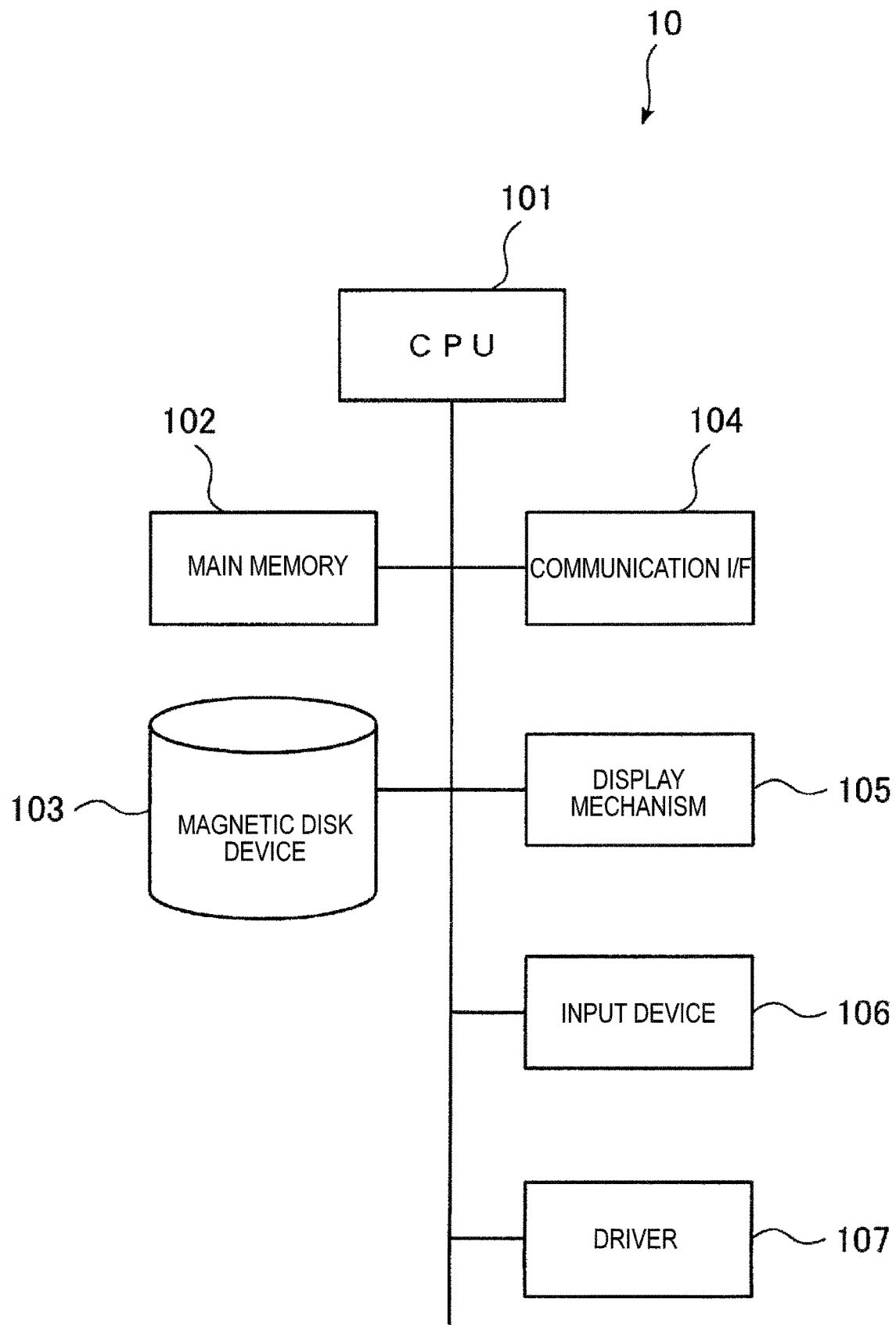
FIG. 3 is a diagram illustrating a hardware configuration example of the control device.

Next, the hardware configuration of the control device 10 will be described. FIG. 3 is a diagram illustrating a hardware configuration example of the control device 10.

As shown in FIG. 3, for example, the control device 10 is realized by a general-purposed Personal Computer (PC) or the like, and includes a CPU 101, and a main memory 102, and a magnetic disk device (a Hard Disk Drive (HDD)) 103 that are storage regions. Here, the CPU 101 executes various programs such as an Operating System (OS) or application software, and realizes each function of the control device 10. The main memory 102 is the storage region that stores the various programs and data used for executing the various programs, and the HDD 103 is the storage region that stores input data for the various programs, output data from the various programs, and the like.

The control device 10 includes a communication I/F 104 for performing communication with the outside, a display mechanism 105 including a video memory, a display, or the like, an input device 106 such as a keyboard or a mouse, and a driver 107 for reading and writing data from and to a storage medium.

For example, the function of the control command unit 11 in the control device 10 is realized by the CPU 101 executing the various programs such as the OS or the application software.

For example, the storage unit 12 is realized by the HDD 103. For example, the communication unit 13 is realized by the communication I/F 104. However, FIG. 3 is merely the configuration example of the hardware, and the control device 10 is not limited to the configuration illustrated in the drawing. The program for realizing the embodiment of the present invention is able to be provided by being stored in a magnetic disk, an optical disk, a semiconductor memory or other recording medium and distributed, or distributed through a network.

<Processing Procedure of Communication>

Figure 4:
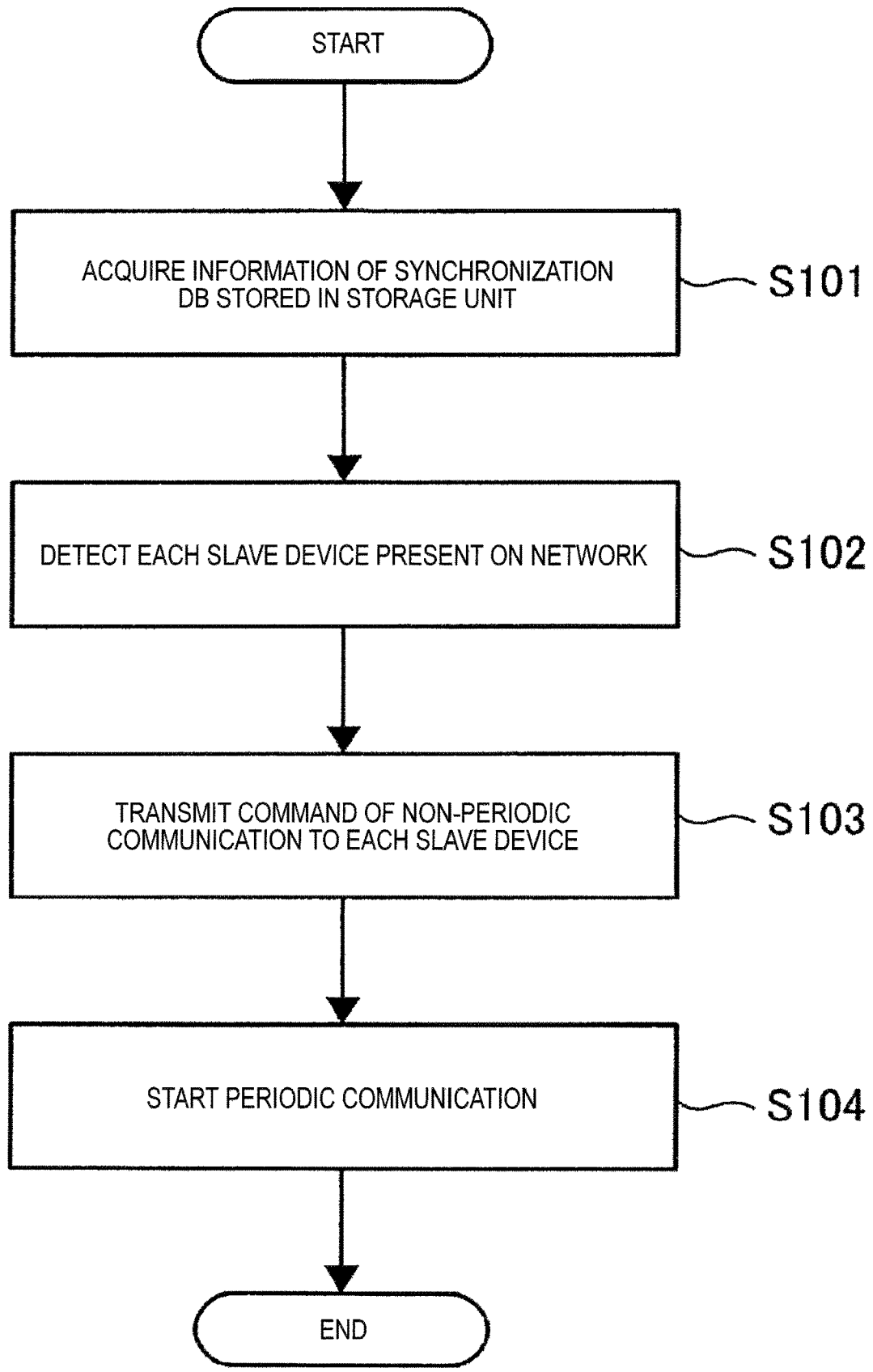
FIG. 4 is a flowchart illustrating an example of a processing procedure of communication performed in the welding system.

Next, the processing procedure of the communication performed in the welding system 1 will be described. FIG. 4 is a flowchart illustrating an example of the processing procedure of the communication performed in the welding system 1.

First, in a case where an operator turns on the power source of the control device 10, the control command unit 11 of the control device 10 acquires the information of the synchronization DB stored in the storage unit 12 (step 101). Next, the control command unit 11 detects each slave device 20 present on the network in the welding system 1 (step 102). Here, when each slave device 20 is detected, information of an IP address or the like of each slave device 20 is stored in advance in the synchronization DB or the like.

The control command unit 11 transmits data to the network and detects an order in which the slave devices 20 having the ID address determined in advance are disposed on the network.

Next, the control command unit 11 transmits the command of the non-periodic communication to each slave device 20 through the communication unit 13 so as to perform the parameter setting and the parameter correction in each detected slave device 20 (step 103). After the parameter setting and correction of each slave device 20 are performed by the command of the non-periodic communication, the control command unit 11 starts the periodic communication (step 104).

In the periodic communication, the control command unit 11 generates the clock signal in each synchronization period based on the information of the synchronization DB acquired in step 101, and transmits the clock signal to each slave device 20. The control command unit 11 generates the command data for each slave device 20. The control command unit 11 allocates each piece of command data corresponding to the respective slave device 20 to at least one communication period in the synchronization period based on the information of the synchronization DB, and transmits the control command frame including the allocated command data in each communication period.

The control command unit 11 receives the control command frame that has returned through all slave devices 20 and recognizes the processing result of each slave device 20 based on the monitor data stored in the control command frame. The transmission and reception of such control command frame are performed in each communication period and processing of one synchronization period is performed. The processing of one synchronization period is repeatedly executed and thus each slave device 20 is controlled so that each slave device 20 synchronously operates.

<Description of Control Command Frame Transmitted in Periodic Communication>

Figure 5:
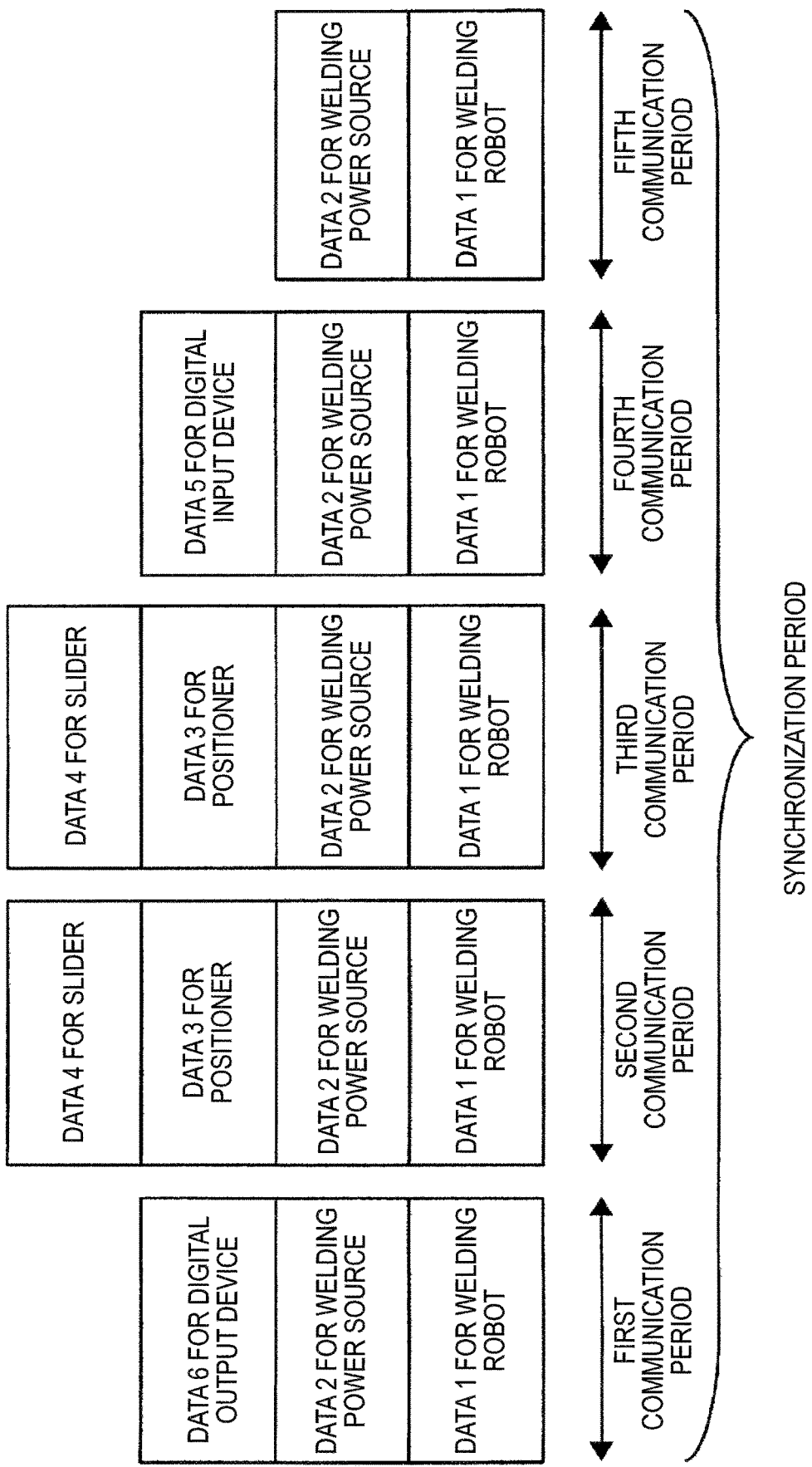
FIG. 5 is a diagram for describing an example of a control command frame transmitted from the control device to each slave device in periodic communication.

Next, the control command frame transmitted from the control device 10 to each slave device 20 in the periodic communication will be described. FIGS. 5 and 6 are diagrams for describing an example of the control command frame transmitted from the control device 10 to each slave device 20 in the periodic communication. In the example shown in FIGS. 5 and 6, the synchronization period is divided into five, and five communication periods are included in the synchronization period. It is assumed that the synchronization period is set as 5 msec and the communication period is set as 1 msec in advance.

As shown in FIG. 5, data 1 to data 6 are data generated for each slave device 20 as the command data addressed to the slave device 20. Here, the data 1 is the data for the welding robot 21, the data 2 is the data for the welding power source 22, and the data 3 is the data for the positioner 23. The data 4 is the data for the slider 24, the data 5 is the data for the digital input device 25, and the data 6 is the data for the digital output device 26.

The control device 10 allocates the data 1 to data 6 that are data addressed to the respective slave device 20 to the respective communication periods based on the synchronization DB stored in the storage unit 12 and transmits the data 1 to data 6. In the example shown in FIG. 5, the data 1, the data 2, and the data 6 are transmitted in a first communication period. The data 1, the data 2, the data 3, and the data 4 are transmitted in a second communication period. Similarly to the second communication period, the data 1, the data 2, the data 3, and the data 4 are transmitted in a third communication period. The data 1, the data 2, and the data 5 are transmitted in a fourth communication period. The data 1, and the data 2 are transmitted in a last fifth communication period.

That is, the data 1 for the welding robot 21 and the data 2 for the welding power source 22 are transmitted and received in all of the five communication periods. The data 3 for the positioner 23 and the data 4 for the slider 24 are transmitted and received in the second and third communication periods among the five communication periods.

The data 5 for the digital input device 25 is transmitted and received in the fourth communication period, and the data 6 for the digital output device 26 is transmitted and received in the first communication period.

Specifically, as shown in FIG. 6, in a case where it is assumed that a start time of the periodic communication is set as "0 msec", a control command frame storing the data 1, the data 2, and the data 6 is transmitted 1 msec after from the transmission start. Similarly, as processing in the same synchronization period, the control command frame is transmitted 2 msec after from the transmission start, 3 msec after from the transmission start, 4 msec after from the transmission start, and 5 msec after from the transmission start. After 5 msec from the transmission start, in a case where the transmission and reception of the control command frame are performed in the fifth communication period, one synchronization period is ended. Next synchronization period is started. That is, after 6 msec from the transmission start, in the first communication period of the next synchronization period, the control command frame storing the data 1, the data 2, and the data 6 is transmitted.

As described above, the transmission and reception of the data are performed so that the data is not greater than the maximum capacity of a frame that is able to be transmitted and received at once by allocating the data for the synchronous operation to each communication period. For the synchronous operation in the control device 10 and each slave device 20, the data for each slave device 20 may be transmitted and received in at least one communication period among the plurality of communication periods in one synchronization period. That is, in the example shown in FIG. 6, the data 1 to data 6 may be transmitted and received in at least one communication period among communication periods that are divided into five.

Each slave device 20 reflects the command data already acquired in one synchronization period to each timing when the clock signal is received to operate, but in a case where there are a plurality of the already acquired command data, the command data acquired at a last time is reflected. That is, in a case where the slave device 20 receives the plurality of the command data in one synchronization period, the slave device 20 reflects the received command data at the last time of the synchronization period.

In the example shown in FIG. 6, since the command data is transmitted in all of the five communication periods in the synchronization period with respect to the welding robot 21 and the welding power source 22, contents of the command data transmitted in the last fifth communication period are reflected. That is, when the welding robot 21 and the welding power source 22 receive the command data in the first to fourth communication periods, the welding robot 21 and the welding power source 22 store the monitor data indicating the operation state at the time of the reception and transmit the monitor data to the control device 10, but as a result, the command data of the first to fourth communication periods is not used in executing the operation.

Similarly, in the positioner 23 and the slider 24, since the command data is transmitted in the second and third communication periods in the synchronization period, contents of the command data transmitted in the third communication period are reflected.

In a case where the transmission and reception of the command data are not normally performed due to occurrence of noise or the like, command data one before is employed in the same synchronization period. For example, in the welding robot 21, in a case where the transmission and reception of the command data are not normally performed in the fifth communication period, contents of the command data transmitted and received in the fourth communication period that is present one before from the fifth communication period is reflected. Therefore, as the transmission and reception of the command data are performed in two or more communication periods in one synchronization period, it is easy to secure the command data and reliability of the synchronization control is improved as compared with, for example, a configuration in which the transmission and reception of the command data are performed in only one communication period in one synchronization period.

For example, from a viewpoint of improvement of stability of arc tracking and improvement of accuracy of touch sensing, it is preferable that the synchronization period and the communication period are short. Here, the arc tracking is a function of maintaining a relative position between a tip of the welding torch and a welding line constant and an aim position of the welding torch is not deviated from a groove even in a case where there is a deviation from a trajectory of the welding line taught in the welding operation. The touch sensing is a function of applying a voltage between the workpiece and the welding wire to detect a position of the workpiece by using a phenomenon of voltage drop that occurs when the welding wire comes into contact with the workpiece, and correcting a position of the welding robot 21 based on the position of the detected workpiece.

As described above, in FIGS. 5 and 6, the data 1 for the welding robot 21 and the data 2 for the welding power source 22 are transmitted and received in all of the five communication periods. On the other hand, the data 3 for the positioner 23 and the data 4 for the slider 24 are transmitted and received in only second and third communication periods among the five communication periods. In the welding system 1, since it is considered that importance of the welding robot 21 and the welding power source 22 is high, the number of the transmission and reception of the data for the welding robot 21 and the welding power source 22 is set to be higher than the number of the transmission and reception of the data for the positioner 23 and the slider 24.

However, the positioner 23 and the slider 24 have a plurality of drive shafts (for example, two shafts) in the positioner 23 and the slider 24 (the device itself), and ensuring synchronization between such plurality of drive shafts is important to ensure an accurate operation.

Figure 7A:
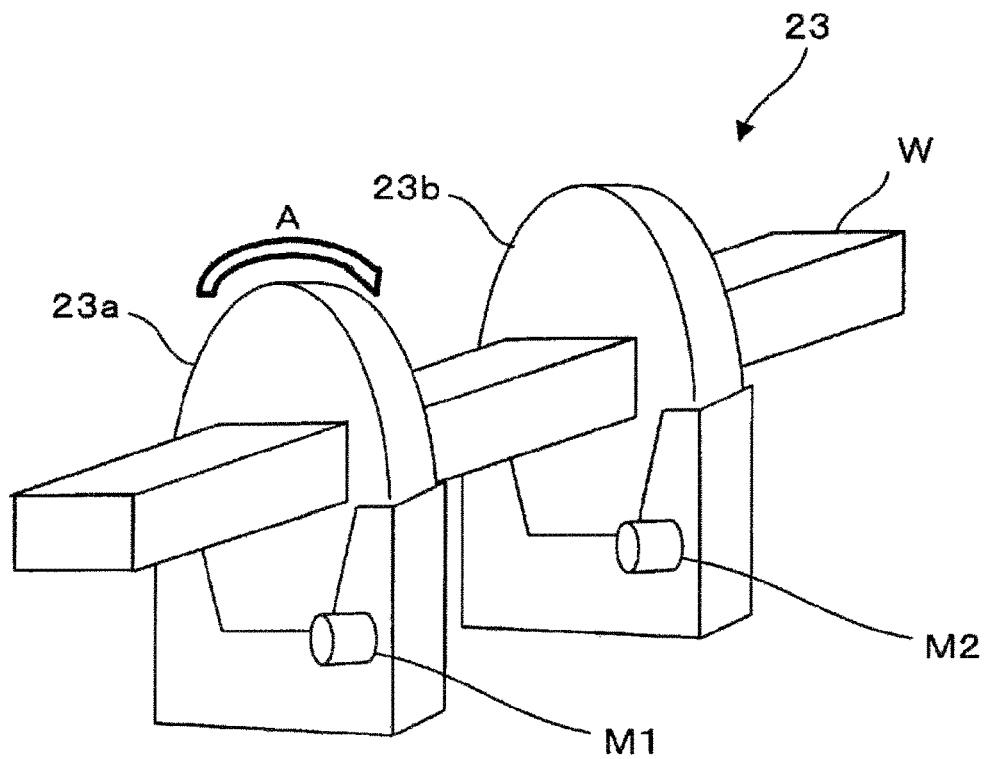
Figure 7B:
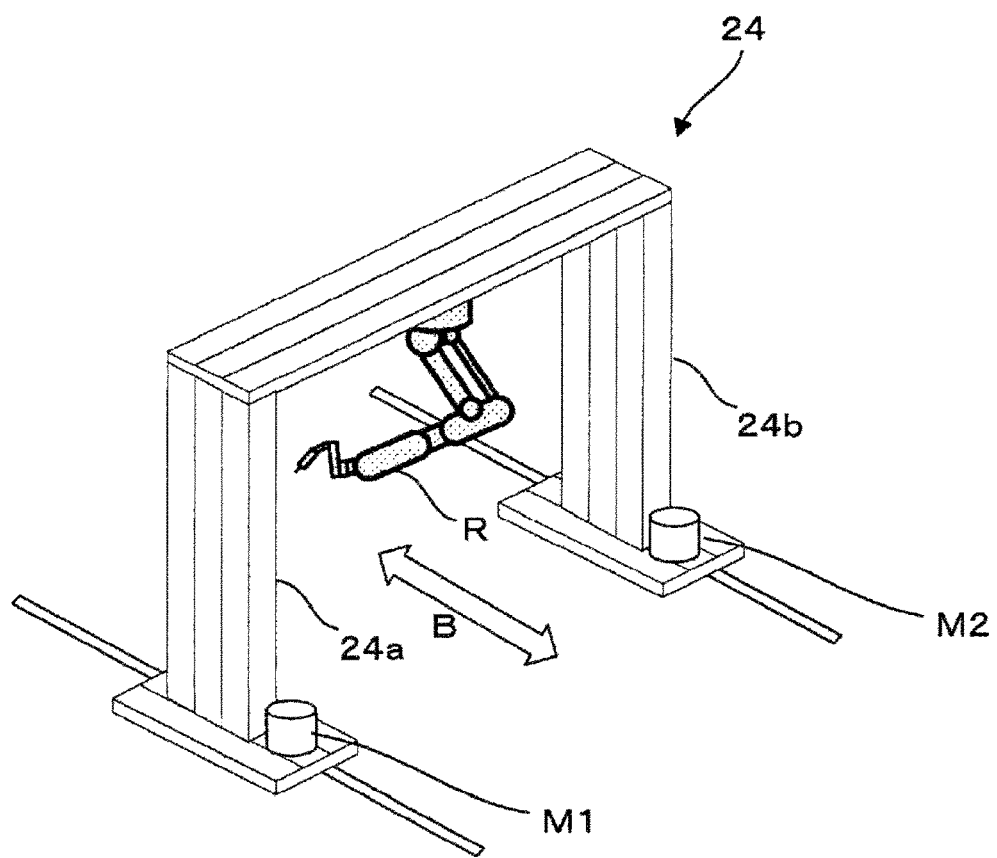

FIGS. 7A and 7B are perspective views of a specific example of the positioner 23 and the slider 24. FIG. 7A shows an example of the positioner 23. In order to determine the position of the workpiece W, the positioner 23 has two drive portions 23a and 23b that each move in a direction of an arrow A. A main motor M1 as a main drive shaft drives the drive portion (a main drive portion) 23a. A following motor M2 that follows the main motor M1 is provided as a following drive shaft, and the following motor M2 drives the drive portion (a following drive portion) 23b.

Since the following motor M2 follows the main motor M1, the main motor M1 is defined as a master and the following motor M2 is defined as a slave. However, in the welding system 1, since the control device 10 is defined as a master and each slave device 20 is defined as a slave, hereinafter, the main motor M1 is defined as a sub master and the following motor M2 is defined as a sub slave.

Such a positioner 23 is required to rotate the workpiece W that is a long structure like a pillar, and in order to prevent twisting of the workpiece W, the main motor M1 as the sub master and the following motor M2 as the sub slave are required to be synchronized as accurately as possible.

FIG. 7B shows an example of the slider 24. In order to move a robot R, the slider 24 has two drive portions 24a and 24b that move in a direction of an arrow B. A main motor M1 as a main drive shaft drives the drive portion (a main drive portion) 24a. A following motor M2 that follows the main motor M1 is provided as a following drive shaft, and the following motor M2 drives the drive portion (a following drive portion) 24b. Here as well, similarly to the positioner 23, the main motor M1 is defined as a sub master and the following motor M2 is defined as a sub slave.

Such a slider 24 has a gate-like structure, and the drive portions 24a and 24b correspond to two pillar portions, respectively, and in order to prevent twisting of the slider 24 itself, the main motor M1 as the sub master and the following motor M2 as the sub slave are required to be synchronized as accurately as possible.

In the related art, a method of monitoring a movement position (rotational position) of the sub master by an encoder, transmitting a command of a pulse signal based on the monitor to the sub slave, and synchronizing the sub slave to the sub master has been adopted. However, in such a method, since the sub slave is operated based on an operation result of the sub master, when an operation start is delayed and a drive situation largely changes such as during acceleration and deceleration, deviation of a position deviation between the sub master and the sub slave becomes large, and it is difficult to perform synchronization control. Special parts such as a pulse encoder and a special servo amplifier for the pulse encoder are required, which has increased cost and the like.

Therefore, in the present embodiment, it is possible to easily ensure high synchronization accuracy by ensuring synchronization by mutual communication between the plurality of drive shafts of the positioner 23 and the slider 24.

As a premise, for the control command unit 11 to perform the parameter setting and the parameter correction in each slave device 20 detected in step 103 of FIG. 4, the control command unit 11 transmits the command of the non-periodic communication to each slave device 20 through the communication unit 13. Here, the control command unit 11 as the calculation unit and the communication control unit further transmits the command for the parameter setting, the parameter correction, and the like used for the operation or the mutual communication of the plurality of drive shafts, that is, the sub master and the sub slave, in addition to the command of the non-periodic communication for other slave devices, with respect to the positioner 23 and the slider 24 in the slave device 20.

In addition to the information on the synchronization period and the communication period, the storage unit 12 also stores information on the mutual communication through which the sub master and the sub slave communicate with each other. That is, in the synchronization DB of the storage unit 12, a position of the sub master and the sub slave on the network, a data type (position data, torque data, and the like) that performs the mutual communication between the sub master and the sub slave, and mutual communication setting information on various settings of the mutual communication in performing the mutual communication between the sub master and the sub slave such as a command on and off of a function of a mutual correction control or a correction ratio parameter are stored. Such information of the synchronization DB is used when the control command unit 11 transmits the clock signal and the control command frame by the periodic communication. In the present embodiment, the storage unit 12 is used as an example of the storage unit.

In the present embodiment, the control device 10 (the control command unit 11 as the calculation unit and the communication control unit) as the master also calculates the control command for each of the sub master and the sub slave corresponding to the two shafts in the control command to the positioner 23 (or the slider 24) based on the information stored in the storage unit 12. It may be understood that the command to the positioner 23 (or the slider 24) may include the command for each of the sub master and the sub slave, that is, a target value to be set as a target by the sub master and the sub slave, and various settings of the mutual communication. The control device 10 (the control command unit 11 as the calculation unit and the communication control unit) transmits the control command including a command to be mutually communicated in a mutual communication period with respect to the positioner 23 (or the slider 24). That is, the control command includes mutual communication control information comprehensively including mutual communication setting information and a target value required for the mutual communication between the sub master and the sub slave of the positioner 23 (or the slider 24). The positioner 23 (or the slider 24) receives the control command, and the sub master and the sub slave operate while performing the mutual communication toward the target value with reference to the mutual communication control information.

The positioner 23 (or the slider 24) receiving the control command (hereinafter, referred to simply as the "control command") including the mutual communication control information (including the mutual communication setting information, the target value, and the like) starts the mutual communication between the sub master and the sub slave. Here, a period of the mutual communication is shorter than the synchronization period described above. Hereinafter, the mutual communication will be specifically described using FIG. 8. A method of the mutual communication is able to adopt a communication method of the related art, for example, a Controller Area Network (CAN).

Figure 8:
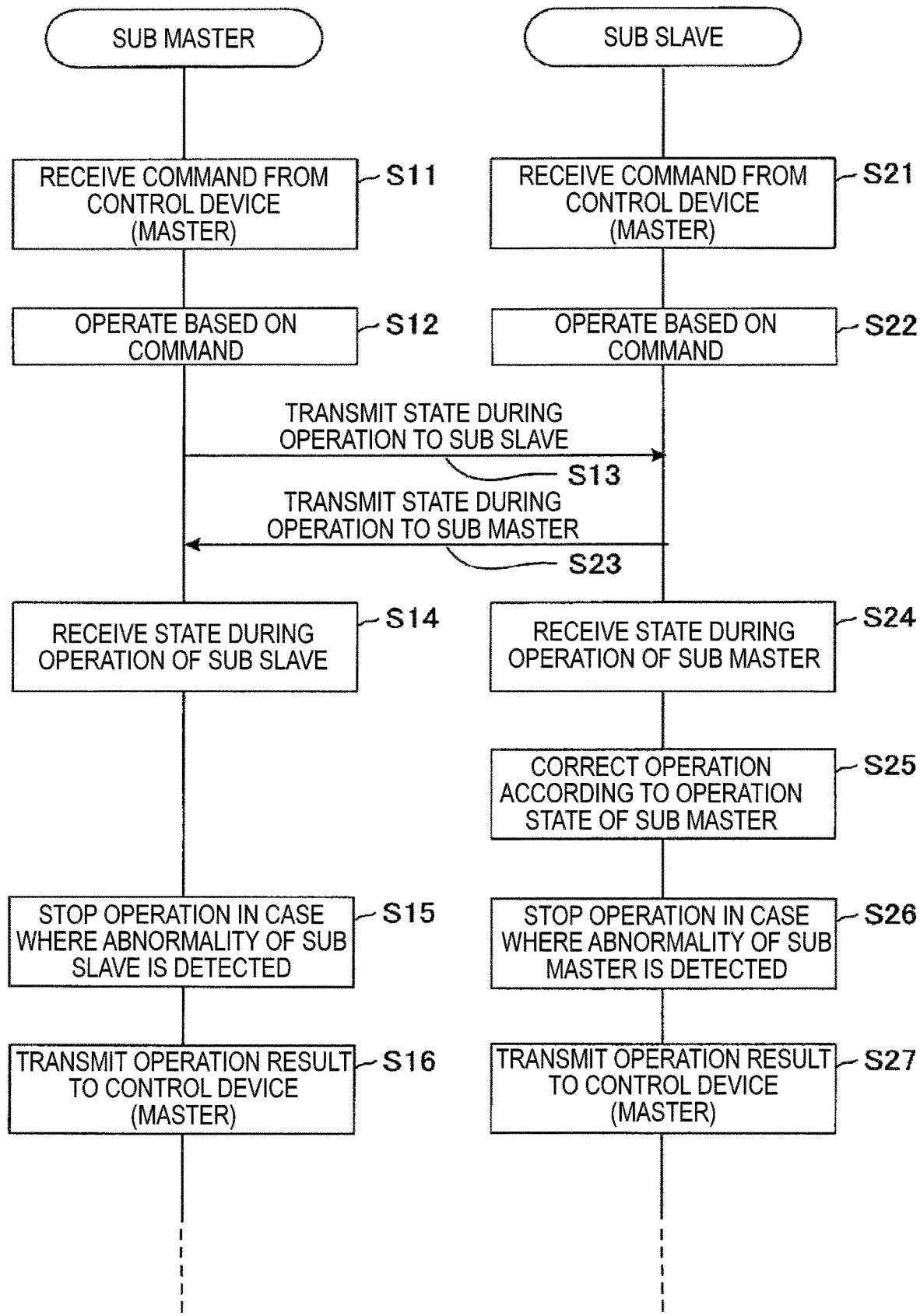
FIG. 8 is a sequence diagram illustrating an example of mutual communication between a sub master and a sub slave.

FIG. 8 is a sequence diagram illustrating an example of the mutual communication between the sub master and the sub slave in the positioner 23 (or the slider 24). First, the sub master and the sub slave receive the control command from the control device (the master) 10 (step 11 and step 21).

The sub master operates based on the control command (step 12), and the sub slave also operates based on the control command (step 22). A state in which the sub master is in operation is transmitted to the sub slave (step 13), and a state in which the sub slave is in operation is transmitted to the sub master (step 23).

The sub master receives the state in which the sub slave is in operation corresponding to step 23 (step 14), and the sub slave receives the state in which the sub master is in operation corresponding to step 13 (step 24). The sub slave corrects the operation of the sub slave according to the operation state of the sub master (step 25). The sub slave is controlling the operation of the sub slave using the operation state of the sub master as a reference and the sub slave may follow the sub master. Basically, the sub master does not correct the operation of the sub master according to the operation state of the sub slave.

In a case where an abnormality of the sub slave is detected, the sub master stops the operation (step 15), and in a case where an abnormality of the sub master is detected, the sub slave stops the operation (step 26). The sub master and the sub slave transmit an operation result to the control device (the master) 10 (step 16 and step 27). Thereafter, the operations of steps 11, steps 21 and the following steps are repeated.

In the example described above, a case where one sub slave is present for one sub master has been described, but a plurality of sub slaves may be present for one sub master. Even in such a case, the sub slave follows the operation of the sub master, and thus an efficient operation correction is possible. That is, in the case where operation correction is performed between the sub master and the sub slave by mutual communication between the sub master and the sub slave, the sub slave may adjust the operation itself according to the sub master.

Here, the synchronization period is longer than a period of the mutual communication (a mutual communication period), but may be a multiple of the mutual communication period. The synchronization period is equal to or less than 10 msec, the mutual communication period is equal to or less than 500 µsec, and a ratio of the synchronization period and the mutual communication period (synchronization period/mutual communication period) is able to be set to be equal to or greater than 20. For example, in a case where the synchronization period is 5 msec as in the example described above, the mutual communication period is able to be set to 125 µsec (synchronization period/mutual communication period =40). This condition is satisfied and thus a merit of using the mutual communication between the sub master and the sub slave becomes large. A value of the mutual communication period may be stored in the storage unit 12 of the control device 10 and may be included in the control command by the communication control unit (the control command unit 11) to be transmitted, but it is preferable that the sub master and the sub slave independently store the value of the mutual communication period in a storage device such as a memory.

In the slave device, since the operation control is performed in the mutual communication period that is a period (125 µsec) faster than the synchronization period (5 msec), even though the operation state changes every moment during the operation control, it is possible to ensure high following. From a viewpoint of following, it is preferable that the mutual communication period is as small as possible.

In the present embodiment, the synchronization period is set to 5 msec, the communication period is set to 1 msec, and the mutual communication period is set to 125 µsec. The plurality of slave devices are synchronously controlled with a long synchronization period of 5 msec, the operations of the sub master and the sub slave in the slave device are corrected at high speed with an extremely small mutual communication period of 125 µsec, and the operation result of each slave device is monitored with a somewhat short communication period of 1 msec.

In the welding system 1, a control method of the sub master is able to be set to be fixed to the position control, and the sub slave is able to be set to select either the position control or the torque control. The position control is a control method of controlling positions of the sub master and the sub slave (a rotation angle in a case of a motor), and the torque control is a method of controlling a generated torque of the motor by a control of a current. In a case where the control method of the sub master is the position control and the control method of the sub slave is also the position control, the control is performed so that the deviation of the deviation between the positions of the sub master and the sub slave is reduced. In a case where the control method of the sub master is the position control and the control method of the sub slave is the torque control, a command of a torque of the sub master is transferred as a command of a torque of the sub slave.

The control method of the sub master is fixed to the position control, and the control method of the sub slave is able to be switched to the position control or the torque control according to a situation (an unbalanced load of a work in the positioner and the slider, a distortion due to heat, or the like).

The control method of the sub master is able to use the position control or a speed control. The speed control is a method of switching a speed of the sub master without a step according to a movement speed command (a rotation speed command in a case of the motor). In a case where the speed control is used as the control method of the sub master, the torque control is generally used as the control method of the sub slave.

Figure 9:
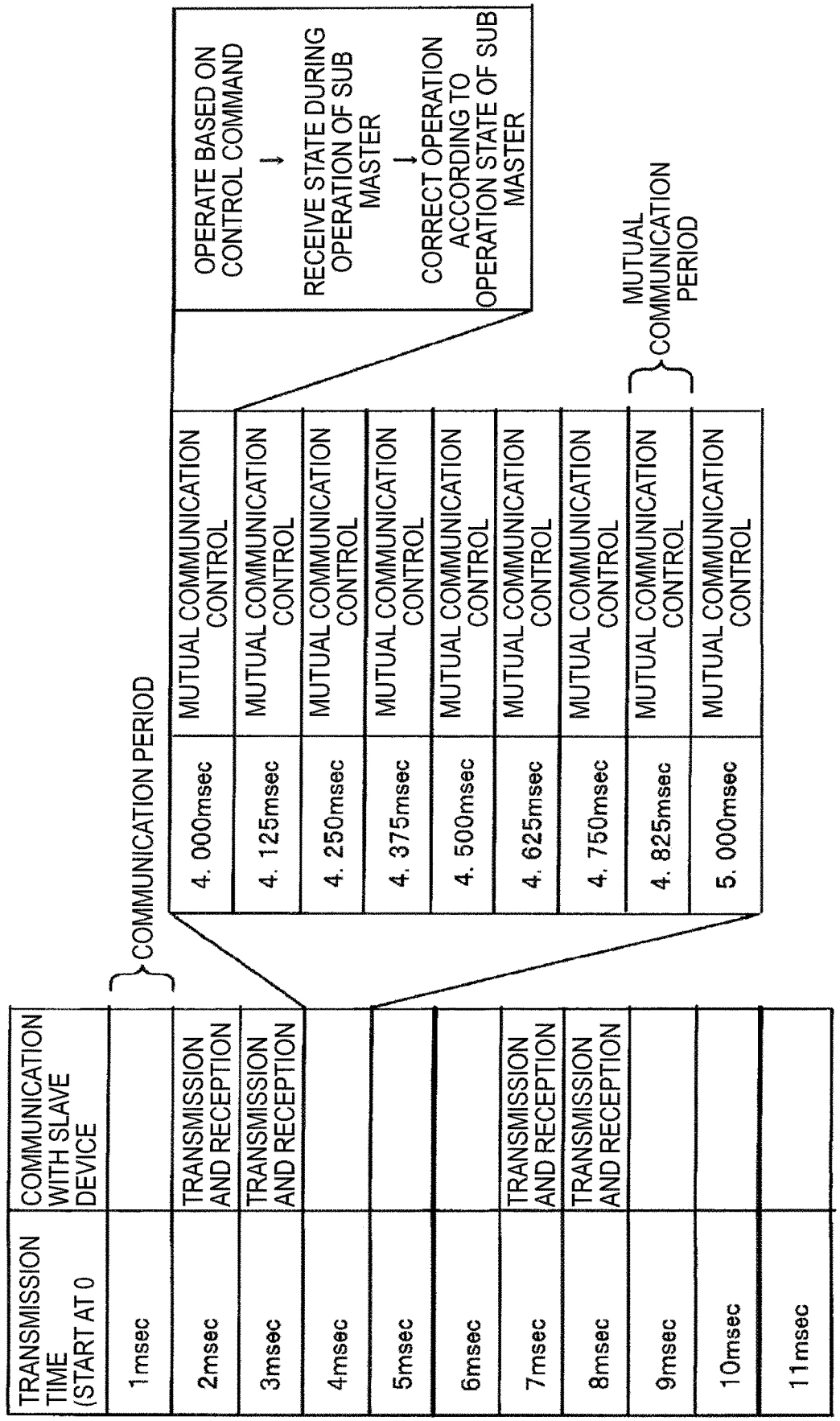
FIG. 9 is a diagram for describing an example of a control command frame and a mutual communication frame transmitted from the control device to each slave device in the periodic communication.

FIG. 9, in correspondence to FIG. 6, is a diagram illustrating a relationship between the control command frame transmitted from the control device to each slave device in the periodic communication of the present embodiment and a mutual communication frame corresponding to the mutual communication between the sub master and the sub slave. The synchronization period is divided into five, and the five communication periods are included in the synchronization period, but the mutual communication period is included in the communication period. The synchronization is set to 5 msec in advance, the communication period is set to 1 msec in advance, and the mutual communication period is set to 125 µsec in advance.

In the related method such as using a pulse signal of an encoder as a control input, a control is a control in which the sub slave follows the sub master after the sub master operates. In such a control method, a delay occurs in a movement of the sub slave, and smooth operation may be hindered. On the other hand, in the present embodiment, since the sub master and the sub slave start at the same time by the mutual communication and are mutually corrected during the operation, it is possible to prevent the movement of the sub slave from being delayed and a more smooth control becomes easy.

Since the mutual communication period between the sub master and the sub slave is shorter than the synchronization period between the slave devices, high following of the slave device is ensured.

In the method of the related art, a special part referred to as a pulse encoder that outputs a pulse for using a position feedback pulse signal from a position detection sensor as the control input signal is required, which causes an increase in cost. However, with the adoption of the present invention, it is unnecessary to adopt such a special part, and it is possible to prevent an increase in cost.

In the present embodiment, a case where the synchronization control is performed in the welding system was described, but the present invention is not limited to such a configuration. The present embodiment is applied to other systems including an industrial robot.

Although the present invention has been described above using the embodiment, the technical scope of the present invention is not limited to the embodiments described above. It will be apparent to those skilled in the art that various modifications and alternative embodiments can be adopted without departing from the spirit and scope of the present invention.

This application is based upon and claims the benefit of priority from Japanese Patent Application No. 2016-060157, filed Mar. 24, 2016, the entire contents of which are incorporated herein by reference.

DESCRIPTION OF REFERENCE NUMERALS AND SIGNS

1: welding system, 10: control device, 11: control command unit, 12: storage unit, 13: communication unit, 20: slave device, 21: welding robot, 22: welding power source, 23: positioner, 24: slider, 25: digital input device, 26: digital output device

The invention claimed is:

1. A communication control system comprising:
a control device;
one or more control target devices; and
a network configured to connect the control device to the one or more control target devices, wherein:
at least one of the one or more control target devices includes a sub-master and a sub-slave to be synchronously controlled with each other; and
the control device includes circuitry configured to:
store pieces of information on a synchronization period that is a period for synchronizing with then at least one of the one or more control target devices, communication periods that are a plurality of periods provided during one period of a corresponding synchronization period, and mutual communication control information for enabling the sub-master and the sub-slave to mutually communicate in a mutual communication period shorter than the synchronization period;
calculate a control command, for each control target device, for commanding an operation of each control target device in synchronization with the at least one of the one or more control target devices; and
transmit the control command including mutual communication control information to the sub-master and the sub-slave of the at least one of the one or more control target devices.

2. The communication control system according to claim 1, wherein
in a case where an operation correction between the sub-master and the sub-slave is performed in the mutual communication between the sub-master and the sub-slave, the sub-slave adjusts an operation itself using the sub-master as a reference.

3. The communication control system according to claim 2, wherein
the synchronization period is a multiple of the mutual communication period, the synchronization period is equal to or less than 10 msec, the mutual communication period is equal to or less than 500 μsec, and a ratio of the synchronization period and the mutual communication period is equal to or greater than 20.

4. The communication control system according to claim 3, wherein a control method of the sub-master is position control and the sub-slave is able to select either the position control or torque control.

5. The communication control system according to claim 2, wherein
a control method of the sub-master is position control and the sub-slave is able to select either the position control or torque control.

6. The communication control system according to claim 1, wherein
the synchronization period is a multiple of the mutual communication period, the synchronization period is equal to or less than 10 msec, the mutual communication period is equal to or less than 500 μsec, and a ratio of the synchronization period and the mutual communication period is equal to or greater than 20.

7. The communication control system according to claim 6, wherein
a control method of the sub-master is position control and the sub-slave is able to select either the position control or torque control.

8. The communication control system according to claim 1, wherein
a control method of the sub-master is position control and the sub-slave is able to select either the position control or torque control.

9. The communication control system according to claim 1, wherein the at least one of the one or more control target devices includes a devices having a plurality of drive shafts, and the sub-master and sub-slave include drive portions of the device having the plurality of drive shafts.

10. The communication control system according to claim 9, wherein the drive portions of the device having the plurality of drive shafts include a first motor as the sub-master and a second motor as the sub-slave.

11. A communication control method for performing communication between a control device and one or more control target devices to be synchronized, at least one of the one or more control target devices including a sub-master and a sub-slave to be synchronously controlled by each other, the communication control method comprising:
storing, by circuitry, pieces of information on a synchronization period that is a period for synchronizing with the at least one of the one or more control target devices, communication periods that are a plurality of periods provided during one period of a corresponding synchronization period, and mutual communication control information for enabling the sub-master and the sub-slave to mutually communicate in a mutual communication period shorter than the synchronization period;
calculating, by the circuitry, a control command, for each control target device, for commanding an operation of each control target device in synchronization with the at least one of the one or more control target devices; and
transmitting, by the circuitry, the control command including mutual communication control information to the sub-master and the sub-slave of the one or more control target devices.

* * * * *